J. BECKER.
SCRAPER ATTACHMENT FOR BOTTLE CROWNING MACHINES.
APPLICATION FILED MAY 23, 1918.
1,292,997.
Patented Feb. 4, 1919.
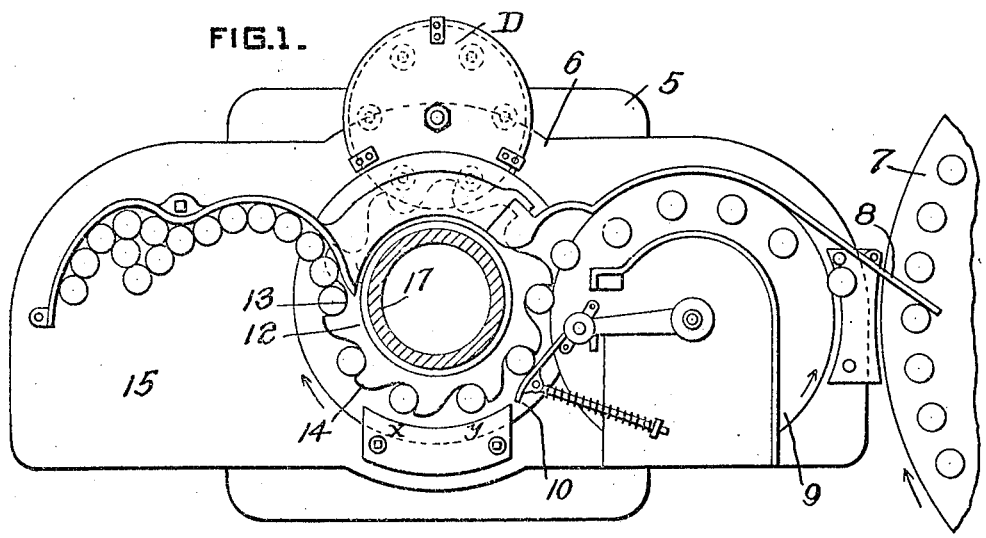

UNITED STATES PATENT OFFICE.

JOHN BECKER, OF PITTSBURGH, PENNSYLVANIA, ASSIGNOR TO EMIL SCHWARZ, OF CHICAGO, ILLINOIS.

SCRAPER ATTACHMENT FOR BOTTLE-CROWNING MACHINES.

1,292,997.    Specification of Letters Patent.    Patented Feb. 4, 1919.

Application filed May 23, 1918. Serial No. 236,138.

*To all whom it may concern:*

Be it known that I, JOHN BECKER, a citizen of the United States, residing at Pittsburgh, in the county of Allegheny and State of Pennsylvania, have invented certain new and useful Improvements in Scraper Attachments for Bottle-Crowning Machines, of which the following is a specification.

My invention relates primarily to bottle crowning machines of the type in which, during the rotary movement of the bottle carrying table, the bottles are crowned or capped by mechanism operating to exert considerable pressure upon the bottles in the act of capping them. It is almost a commonplace occurrence to have bottles break under this pressure, especially if they are in the slightest degree canted off from the vertical, and this not infrequently happens where particles of glass and debris from prior breakages have been overlooked by the operator of the crowning machine.

The invention has reference more particularly to the provision in such machine of an attachment the inventive objects of which are to provide a means capable of automatically scraping away or clearing the table or bottle support of all particles of glass or other foreign matter thereon in a thoroughly efficient manner; and a means capable of effecting this purpose during rotation of the table and without requiring any attention whatever from the operator.

These, together with such other objects as may be hereinafter described, or are incident to my invention, I attain by means of a construction illustrated in preferred form in the accompanying drawings, wherein—

Figure 1 is a diagrammatic top plan view of a bottle crowning machine table to which my attachment is shown applied;

Fig. 2 represents an enlarged top plan view of the attachment and fragmentary portions of the parts with which it co-operates;

Fig. 3 is a central vertical sectional view taken along the line III—III of Fig. 2; and Fig. 4 is a bottom plan view of the scraper proper.

In the views, the reference numeral 5 denotes the base and 6 the frame of a bottle crowning machine of a type similar to that described and illustrated in Letters Patent No. 1,096,527 of May 12th, 1914. In this machine, the bottles are generally filled on the filler 7 and through the medium of deflector arm 8 and carrier 9 the bottles are then delivered, at one side, to the rotary crowning table 10 upon the cushion mats 11 on which the bottles are centered and positioned by a rotary member 12 whose upper and lower sets of fingers 14 have arcuate depressions or recesses 13 into which the bottles fit. When a brace of bottles has been brought by members 10 and 12 to register with the points indicated by $x$ and $y$, they are crowned under considerable pressure by the crowning mechanism (not shown) and are then delivered from the opposite side of the table to the storage space 15 of the frame 6 for subsequent removal. While these above recited elements form no part of my invention, it may be briefly stated in order to obtain a clear understanding of my improved device that the crowning table 10 and bottle positioning member 12 are permanently secured together, as by bolt 16, for synchronous rotative movement about the column 17, the table having interiorly secured to it an annular gear $10^a$ capable of being actuated by gearing 18, 19 and shaft 20. The bottle cushioning mats 11 are countersunk into the upper surface of the table 10, and my invention is designed to scrape and clear these mats of any glass particles thereon which may have been overlooked by the operator of the machine. These particles getting under the bottles frequently tend to cant them and this inevitably results in their breakage during the crowning operation.

The preferred construction of my scraping or clearing attachment embodies a circular rotary plate member A provided on its underface with a series of arcuate scraper members B radiating from a common central boss C and terminating in a spaced relation at the periphery of the plate. If desired a stationary guard or housing member D may be employed.

The reference letter E designates a bolt which, as shown, serves as a spindle for the plate during its rotation and acts to associate it and the guard D with the frame 6 at the rear of the column. As indicated in Fig. 3, the bolt E passes through the boss C and when the nut F is screwed home on the bolt and against the frame 6 the entire structure is maintained in operative relation.

When thus positioned, a portion of the plate A extends through the inner open side of the guard over and beyond an adjacent segmental mat-carrying portion of the table, while another portion of the plate projects outwardly over and beyond the marginal boundary of the frame 6. The plane of the lower faces of the arcuate members B and that of the upper faces of the mats and table are co-incident, or substantially so, in order that glass particles thereon may be cleared or scraped away as the plate rotates on its spindle, and which are discharged over the side of the frame into any suitable receptacle.

Means are also provided on the upper surface of the plate A whereby the rotative movement of the bottle positioning member 12 is communicated to the plate, said means embodying a series of abutments or bosses G each rotatively mounted about a spindle $f$ carried in the plate. These abutments are so constructed and arranged with reference to member 12 as to be successively engaged by the positioning fingers 14, and when thus engaged each are in turn received in a corresponding recess 13. The bosses G in moving into and out of these recesses rotate about their own axes in order to facilitate this movement. It will thus be apparent from the above description that the plate, in rotating with its scraper members in contiguity with the upper surface of the mats as the table in turn rotates, operates to clear away and discharge from the table any particles of glass or other foreign matter, which, if left undisturbed, would in all likelihood work under the bottles to be crowned, with resultant breakage of the latter.

I do not intend to restrict myself to the exact construction, or to the precise arrangement of the parts as shown, as it is obvious that variations and modifications of the same may be made without departing from the spirit and scope of my invention as pointed out in the following claims.

What I claim is:

1. In a bottle crowning machine, the combination with a device movable to position the bottles for crowning including a horizontal support, of a frame having a horizontal portion positioned adjacent said support and in substantially the same plane, a support engaging member mounted in said portion to have its under face registering substantially with said portion and constructed and arranged to wipe the upper surface of said support of glass particles during movement of said device.

2. In a bottle crowning machine, the combination with a frame and a device movable relatively of said frame to position the bottles for crowning including a bottle crowning table, of projections on said device, a rotary means constructed for wiping the upper surface of said table of glass particles thereon after the bottles have been crowned comprising a scraper device mounted in said frame to operatively engage said projections.

3. In a bottle crowning machine, the combination with a frame, and a means mounted in said frame for relative movement to position the bottles for crowning including a plurality of horizontal bottle supports, of a rotary device having its under-face constructed and arranged for movement in a horizontal plane above said frame and formed with wiping elements adapted to successively wipe said supports clear of foreign matter deposited thereon, said device actuable by said means.

4. In a bottle crowning machine, the combination with a horizontal frame, and a bottle holding means movably mounted in said frame comprising a body portion and a carrier provided with a series of spaced bottle supports, of a movable support-wiping device constructed to be actuable by said means and embodying horizontally disposed rigid elements adapted to successively engage and wipe the upper faces of said supports during actuation of the device, said elements movable from said supports over said frame after wiping said upper faces.

5. In a bottle crowning machine, the combination of a frame, bottle carrying means therein embodying a rotary bottle positioning member having fingers and a bottle support, a rotary scraping device for said support provided on its upper surface with a series of bosses adapted to be engaged successively by said fingers whereby to impart rotary movement to said device, and having on its lower surface a series of radial scraper arms, said device mounted in said frame to position one of said arms in contiguity with the upper face of the support.

6. In a bottle crowning machine, the combination of a frame, bottle carrying means therein embodying a rotary bottle positioning member having fingers, and a bottle support, a rotary scraping device for said support provided on its upper surface with a series of bosses adapted to be engaged successively by said fingers, whereby to impart rotary movement to said device, and having on its lower surface a series of radial scraper arms, said device mounted in said frame to position one of said arms in contiguity with the upper face of the support, another of said arms projecting outwardly beyond said frame.

7. In a bottle crowning machine, the combination with a movable bottle support, of a frame, a movable support wiping device comprising a body portion carried by said frame and having a support engaging member positioned to overhang the frame after disengaging from the support.

8. The combination of a frame, a bottle support, and a support wiping device, said support and wiping device operatively positioned in said frame for movement and provided intermediate there axes of movement with horizontally disposed means constructed and arranged to wipe the upper faces of said support, the movement of the bottle support being communicated to the wiping device.

9. A bottle support wiping device comprising a body portion having spaced wiping elements whose under-faces are disposed in the same plane and being provided with means whereby movement may be imparted to said elements relatively of the bottle support.

10. In a device of the character described, the combination of an apertured body portion provided with outwardly extending rotatable wiping elements whose under-faces are disposed in the same plane, a casing for said device having an open side, a spindle for said body portion and casing, and a plurality of abutments provided on said body and adapted to successively register with said open side during rotation of said elements.

JOHN BECKER.

Copies of this patent may be obtained for five cents each, by addressing the "Commissioner of Patents, Washington, D. C."